March 5, 1968 W. ANDERSEN 3,371,361
WATERCRAFT
Filed Oct. 22, 1965 9 Sheets-Sheet 1

INVENTOR.
WALTER ANDERSEN

March 5, 1968
W. ANDERSEN
3,371,361
WATERCRAFT
Filed Oct. 22, 1965
9 Sheets-Sheet 2
FIG. 3
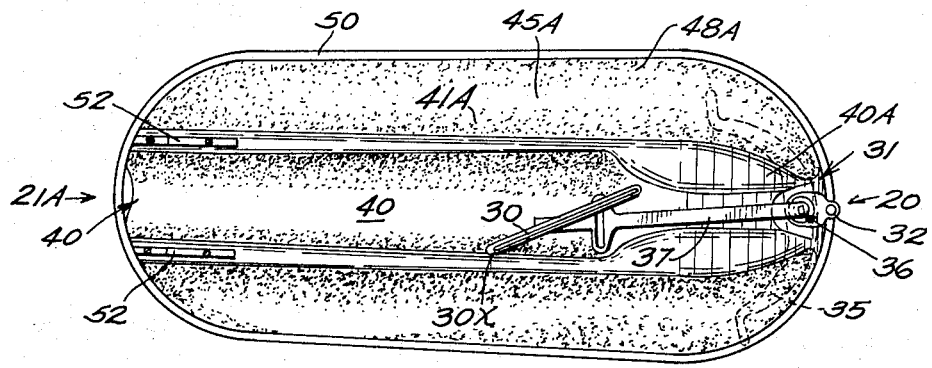
FIG. 4
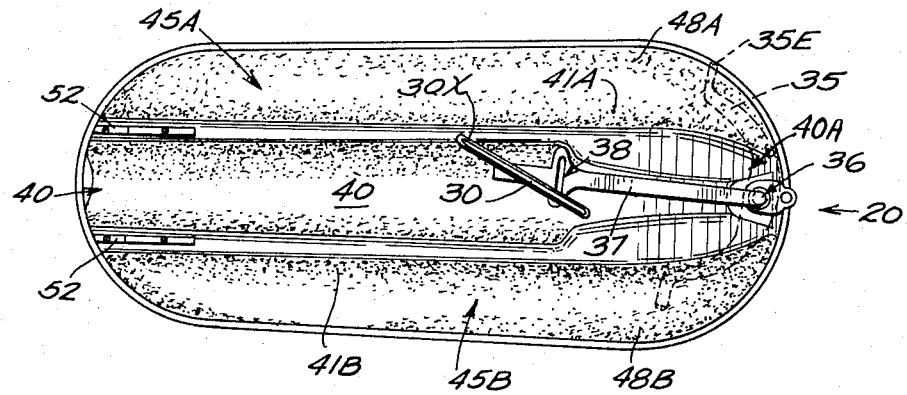
INVENTOR.
WALTER ANDERSEN
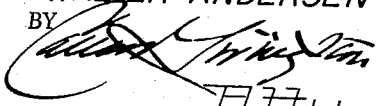

March 5, 1968   W. ANDERSEN   3,371,361
WATERCRAFT
Filed Oct. 22, 1965   9 Sheets-Sheet 3
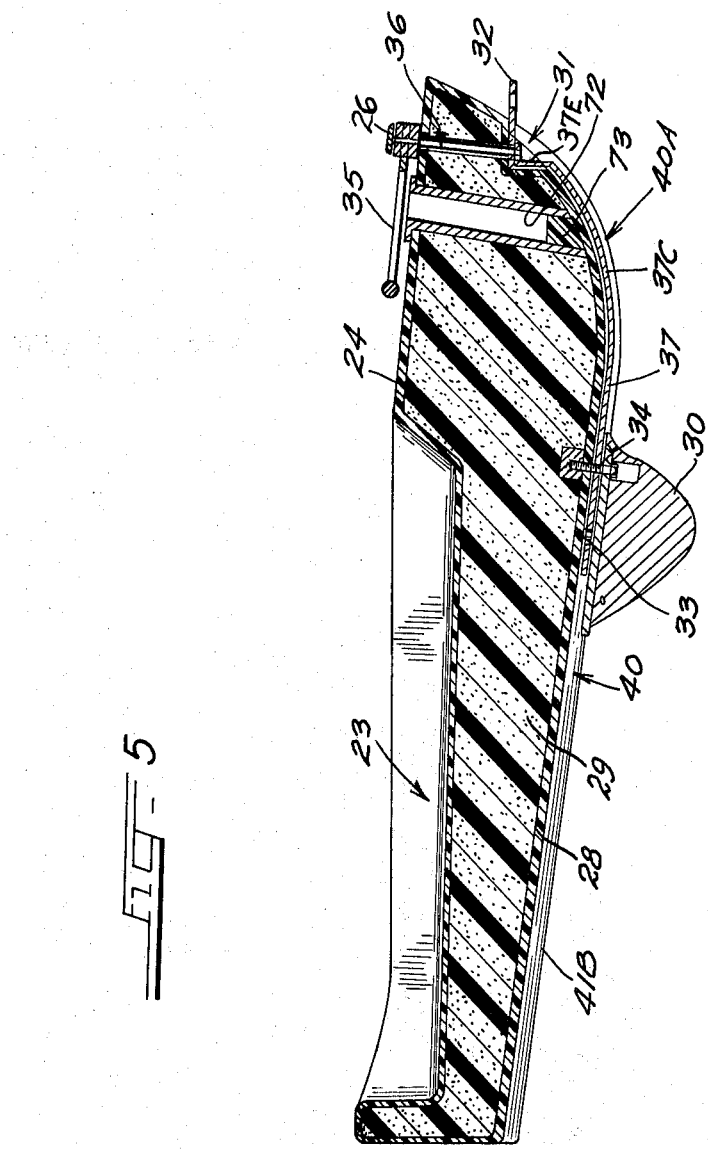
INVENTOR.
WALTER ANDERSEN

March 5, 1968
W. ANDERSEN
3,371,361
WATERCRAFT
Filed Oct. 22, 1965
9 Sheets-Sheet 4
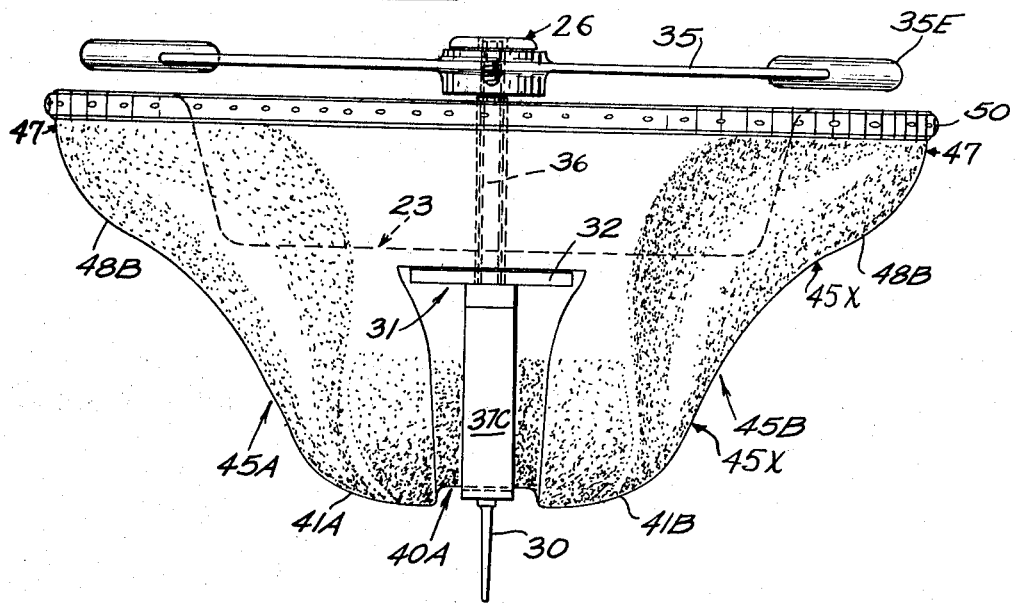
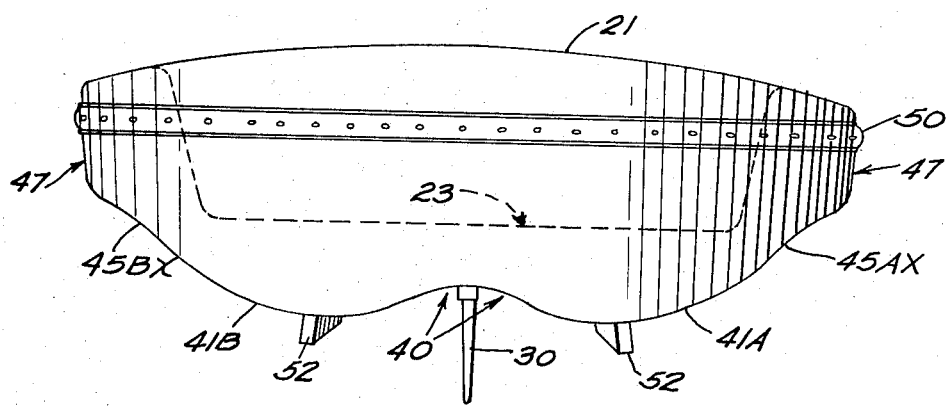
INVENTOR.
WALTER ANDERSEN

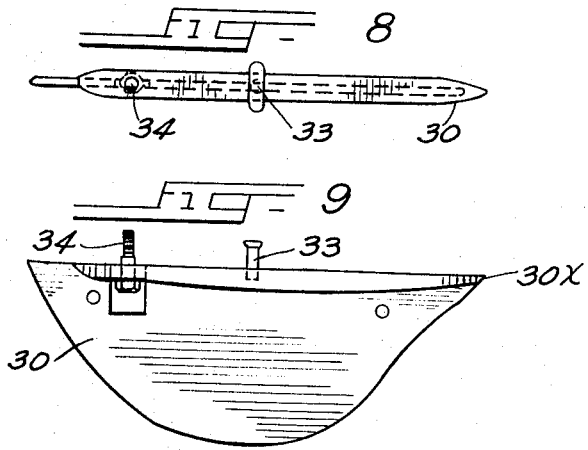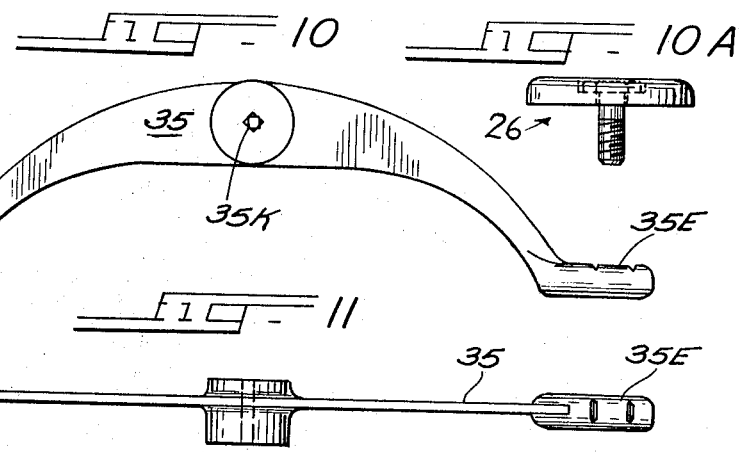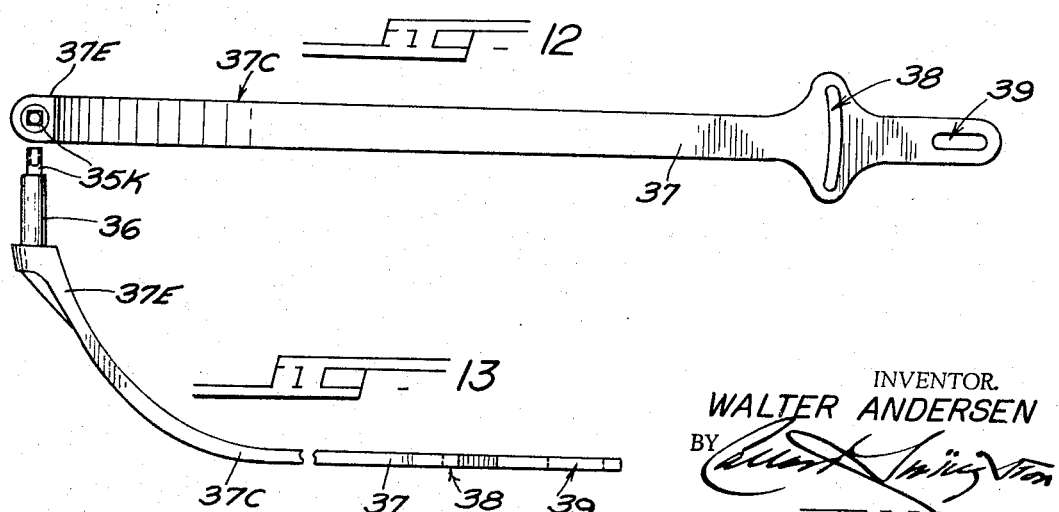

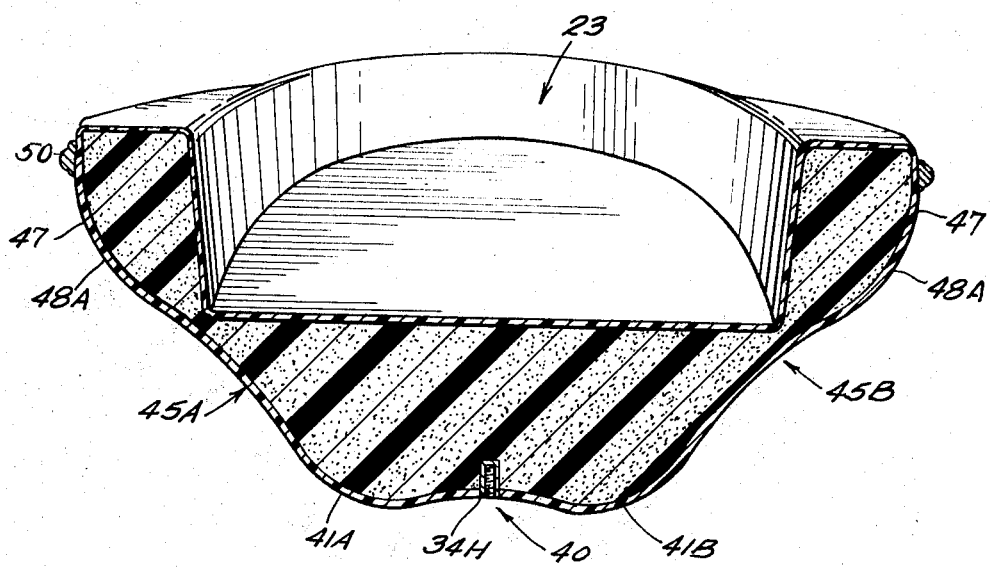
FIG-14
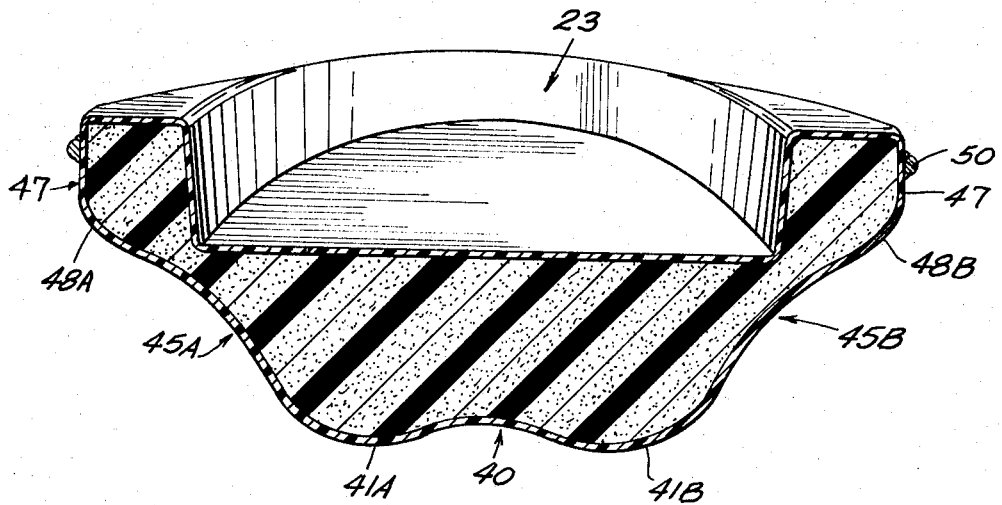
FIG-15
INVENTOR.
WALTER ANDERSEN
BY
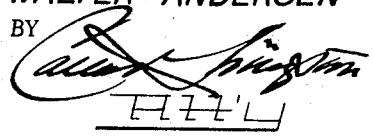

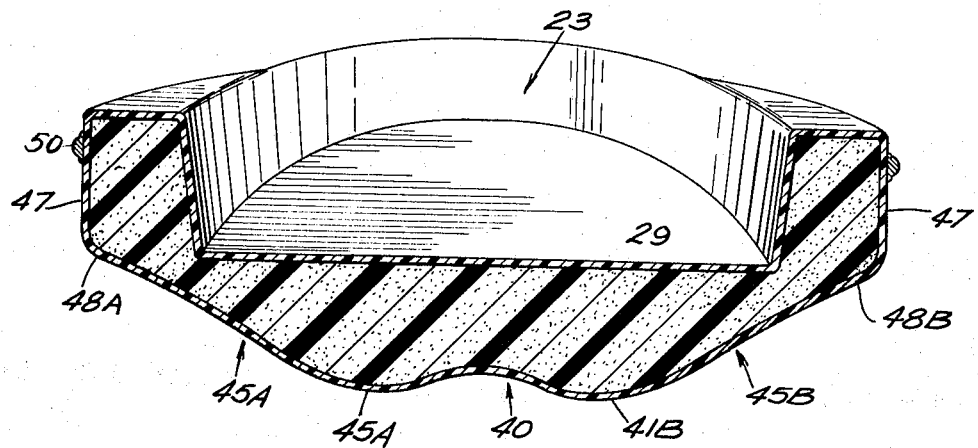
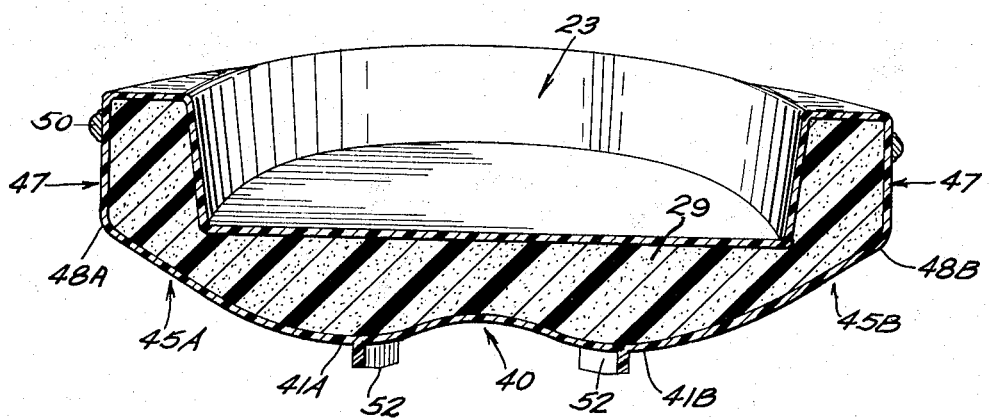

March 5, 1968  W. ANDERSEN  3,371,361
WATERCRAFT
Filed Oct. 22, 1965  9 Sheets-Sheet 8
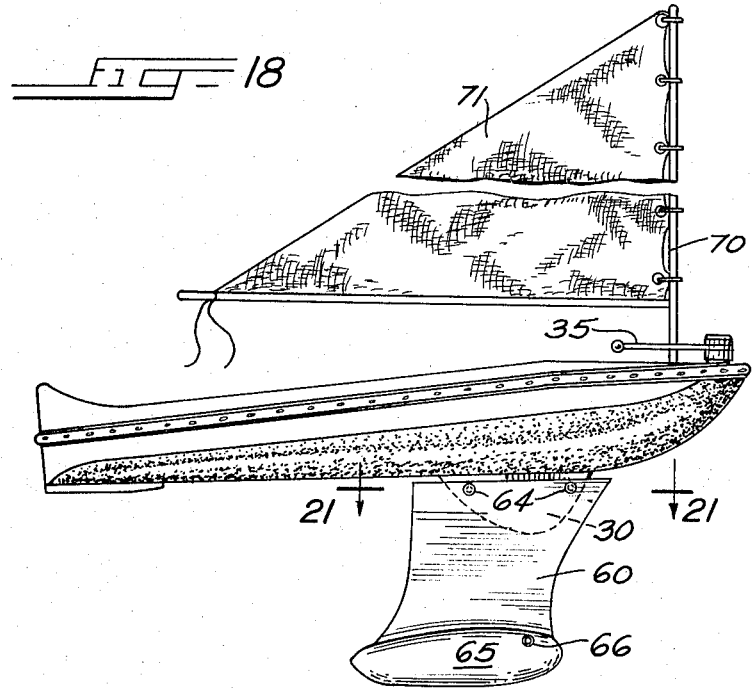
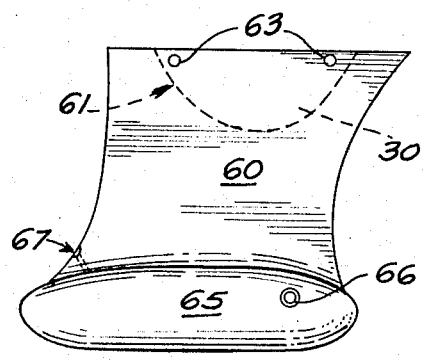
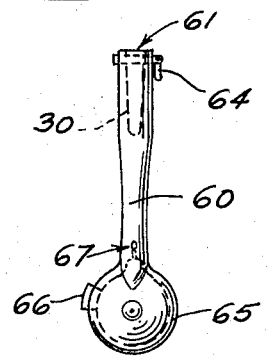
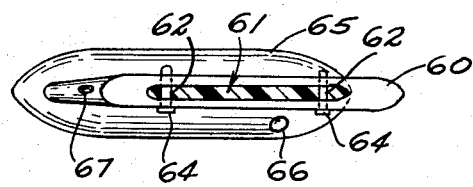
INVENTOR.
WALTER ANDERSEN

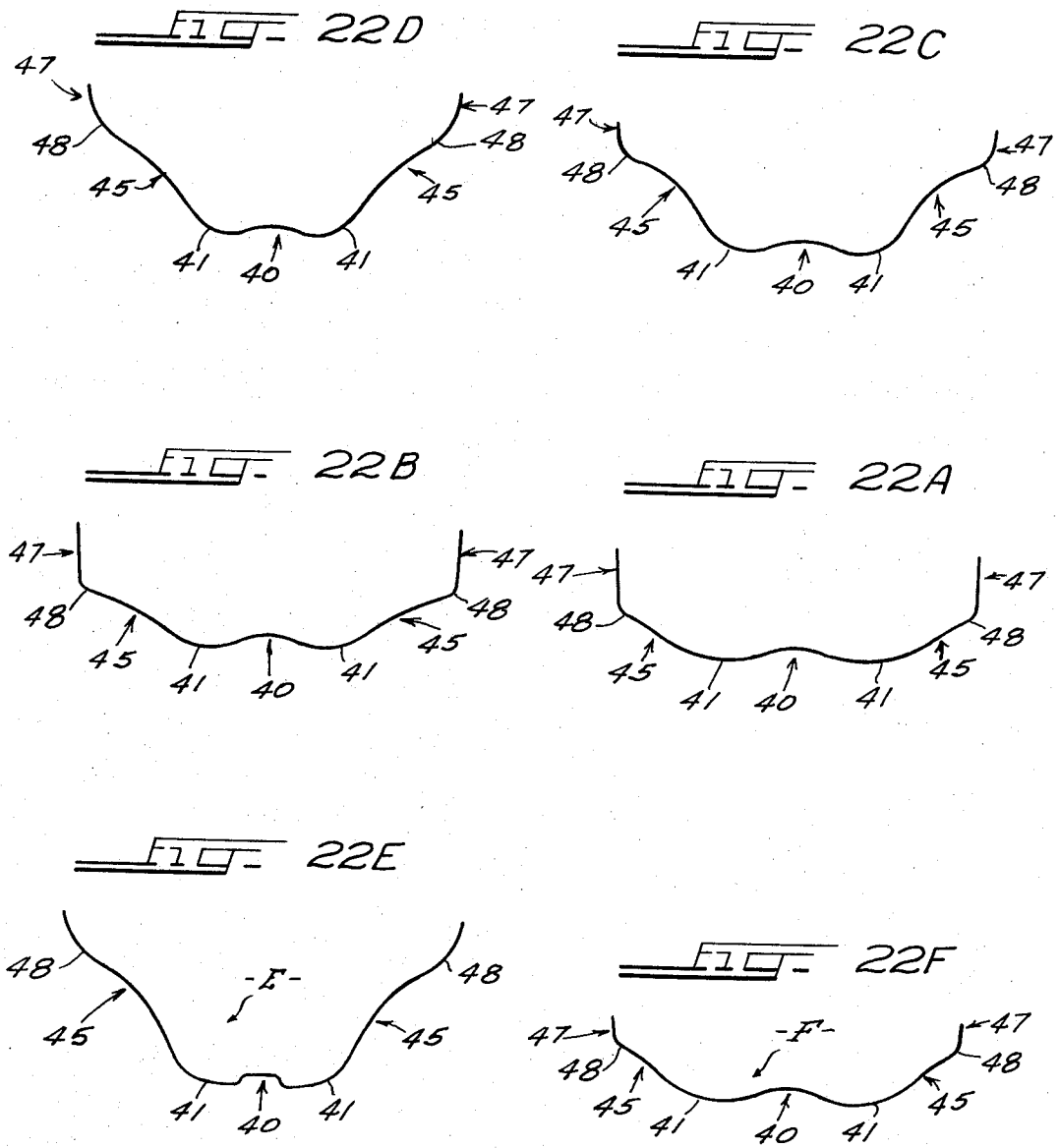

United States Patent Office 3,371,361
Patented Mar. 5, 1968

3,371,361
WATERCRAFT
Walter Andersen, Ottawa, Ill., assignor of one-fifth to W. Russell Bone and one-fifth to John W. Fisher, both of Muncie, Ind.
Filed Oct. 22, 1965, Ser. No. 500,603
9 Claims. (Cl. 9—6)

ABSTRACT OF THE DISCLOSURE

A watercraft suited for towing is provided with a hull having a bottom fore-an-aft cavity flanked by two co-extensive bilges which also run the length of the craft. There is located within the fore-and-aft cavity steering means including a rudder, said rudder being located forward of amidship and aft of the bow.

Figure 1:
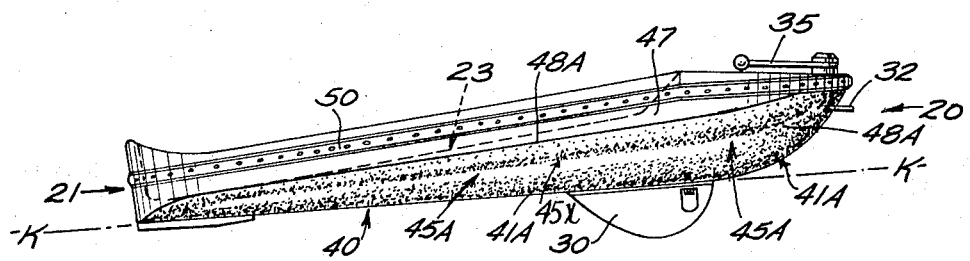

This invention relates to marine craft and the like and includes among its broader objects the provision of a dirigible hull configuration affording a displacement type of hull which is especially adapted to towing for water sport, and which is equally maneuverable towed at very high or very slow speed through a range of movements not possible with previously known craft of this class, and which is largely independent of the course of the towing craft regardless of the water turbulence or the length of the tow line.

The disclosure makes possible a small towing hull of the displacement type which is sufficiently buoyant to sustain heavy loads of the order of six or seven hundred pounds independently of its motion, suited to economical manufacture by molding or laminating processes in sizes weighing around thirty pounds and sufficiently compact for stowage in the luggage compartment of the average automobile.

Among some of the outstanding characteristics of the craft's performance is the fact that on long or short tow lines, at low or high speed, it does not tend to plane or climb out of the water significantly and can hold a course parallel to but widely offset from the course of the towing vessel. It is easily capable of crossing from side-to-side of such course; riding behind, ahead of, on the crest or in the trough of, the wake and wash of the towing vessel, at speeds as high as 40 m.p.h. and more; with the ability to cross and recross any wake smoothly without significant pitching, yawing, rolling, or deviation from its parallel towing course, all such maneuvers being easily effected and controlled without special skill or experience and with easy steering effort at all rudder angles.

Prior watercraft of the sled- and ski-type tend to ride at an angle to the course of the towing vessel and to swing on an arc to the outside of the vessel's turning wake; and to plane, dive, yaw, submerge and otherwise behave erratically or in an unsatisfactory and frequently dangerous manner, depending upon factors such as speed, length of the towing cable, course and manuevering of the towing vessel, condition of the sea and so-on, and to require more or less strength and skill to achieve a rather limited performance which is dangerously vulnerable to the effects of the wake of the towing vessel and wash from other vessels, and which is usually unsafe and unpredictable at very high speeds, most prior sport towing craft being wholly inoperative at the lower speeds such as afforded by small outboard motors in the 5- to 10-H.P. range.

Figure 2:
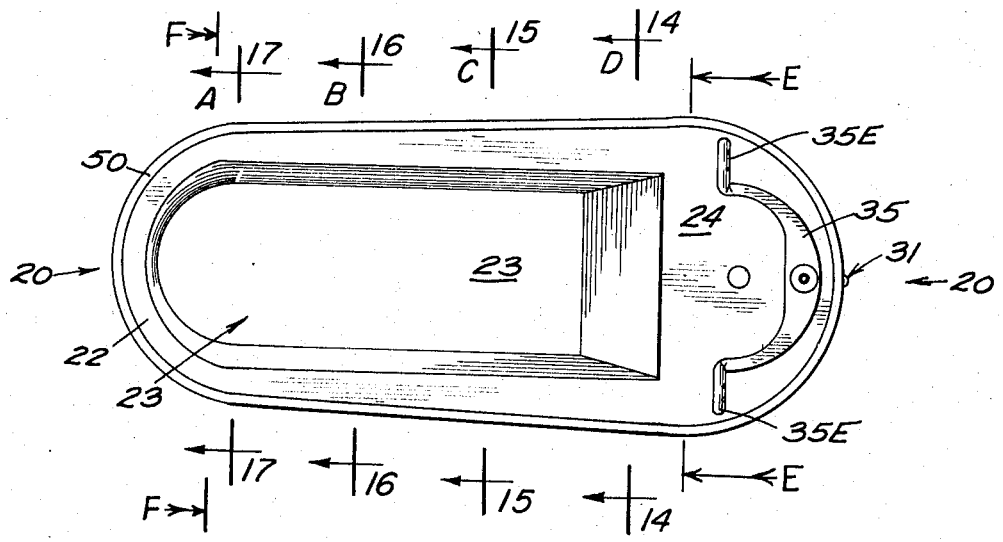

The unusual capabilities and performance of the novel towing hull result from a combination of structural factors relating to the configuration of the wetted surface of the hull and forces developed and utilized thereby co-operatively with the form, location and mode of operation of the steering means, all of which will be more particularly explained as the following description of an illustrative embodiment of the device proceeds in view of the annexed drawings, in which:

FIGURE 1 is a side elevation of the hull;
FIGURE 2 is a top plan view of the hull including designations of stations for certain thwartwise sectional and elevational views;
FIGURES 3 and 4 are bottom plan views showing the rudder in changed positions;
FIGURE 5 is a median longitudinal section of the hull to enlarged scale;
FIGURE 6 is an elevation of the bow to enlarged scale;
FIGURE 7 is an elevation of the stern;
FIGURE 8 is a top plan view of the rudder;
FIGURE 9 is an elevation of the rudder;
FIGURE 10 is a top plan view of the steering bar, and
FIGURE 10A is an enlarged sectional detail of the steering post, bolt and header;
FIGURE 11 is an elevational view of the steering bar;
FIGURE 12 is a plan view of the steering lever link;
FIGURE 13 is an elevational view of the steering link;
FIGURES 14, 15, 16 and 17 are cross sections, to enlarged scale, respectively taken along lines 14—14, 15—15, 16—16 and 17—17 and the corresponding station lines in FIGURE 2, designating the full-breadth sectional configurations at selected stations A, B, C and D;
FIGURE 18 is a side elevation of the craft rigged for sailing;
FIGURE 19 is an enlarged side elevation of a removable fin keel with ballast for the sailing adaptation;
FIGURE 20 is an end view of the keel of FIGURE 19;
FIGURE 21 is a top plan view of the fin keel of FIGURE 19 as viewed along lines 21—21 of FIGURE 18;
FIGURES 22A to 22D are representations of the cross-sectional or thwartship curvatures of the wetted surface of the hull taken at various stations, as indicated at A, B, C and D in FIGURE 2;
FIGURES 22E and 22F represent the thwartship curvatures as seen at the bow and stern, respectively-viewed in elevational planes normal to the base or keel line.

The illustrative embodiment of the device shown in FIGURES 1 and 2 comprises a hull having substantial depth at its bow 20 (for example about 10 inches) and a lesser depth (for example about 5 inches) at its stern 21, both dimensions being measured vertically from a base line K—K parallel to the line or axis of the keel line, the bow area being snubly rounded and affording a considerable proportion of the total buoyancy.

While the hull has rather wide surface areas along its bottom, it does not tend to plane and operates essentially as a shoal-draft displacement type, and can be made substantially as a solid body from floatable materials such as wood, or may be economically fabricated in a very lightweight compartmented shell construction of materials of the class of fibre glass and various resinous synthetics and plastics by known laminating, spraying, blow-mold and other molding processes.

The illustrative embodiment employs a sealed molded construction making the hull suitable for manufacture from fibre glass; which, as seen in FIGURE 2, is of an elongated somewhat oval shape above the water line, with a shallow cockpit 23 suitable for both standing and reclining positions, there being a short foredeck 24 on which a steering yoke or handle bar tiller 35 is situated to pivot within the margins of the deck.

The remaining decking of the hull extends from the foredeck aft in the form of narrow waterways flanking the cockpit and converging into a narrow arcuate after decking 22.

As seen in FIGURE 1, a rudder 30 is located aft of a steering post and forward of a mid-ship station or line which may be assumed to coincide substantially with the section line 15—15 (FIGURE 2), this rudder being of a partially balanced type, the construction and actuation of which will be more particularly described hereafter.

The hull is a water-tight displacement shell having the hollow configuration evident from the longitudinal sectional view of FIGURE 5 taken together with the several cross-sections at the stations represented in FIGURES 14 through 17.

Referring to FIGURE 5, the internal cavity or compartment 28 is preferably filled completely with a light flotation material 29 of the class of Styrofoam or like cellular fillers to maintain high buoyancy in the event of rupture to the hull wall and to lend support to the cockpit floor.

The rudder 30 (FIGURE 3) is set in a fore-and-aft bottom cavity 40 extending along the keel line, and having a special concave configuration further characterized hereinafter, and serving in part to afford lift in the stern quarters and prevent dispersion of water which would affect the rudder action.

A rudder post 34 is set into the hull in said bottom cavity (FIGURES 4 and 5) and engages the rudder near its foreward upper margin so that the rudder is in effect partially balanced but may have over 75 percent of its foil or pressure area aft the rudder post.

Steering movements of the rudder are effected by a shielded outboard lever mechanism affording a mechanical advantage which provides large rudder displacement responsive to relatively slight movement of the yoke-shaped steering bar or tiller 35 set on the foredeck (FIGURES 1, 2 and 5) and keyed as at 35K to a steering post 36 (FIGURES 5, 10, 12 and 13) fast with the upper forward end 37E of a long steering link having a downwardly-curved portion 37C and a straight run 37 (FIGURES 12 and 13) extending aft to terminate in a lateral enlargement in which is an arcuate clearance slot 38 for the rudder post. At the end of the link is a short longitudinal coupling slot 39 drivingly engaging a pin 33 located on the rudder aft and therefore eccentrically of the rudder post, the operation being such that turning of the steering post 36, as by movement of the steering bar 35, will pivot the upper end 37E of the steering link about the axis of the steering post as a center, thus swinging the long span 37 thereof to impart a like but magnified displacement to the rudder through the drive pin 33 and coupling slot 39, the long transverse arcuate slot freely clearing the rudder post to permit this swinging of the link, it being noted that the rudder response is in the same directional sense as the movement of the steering bar, that is, if the steering bar is swung counterclockwise, as seen in the bottom view of FIGURE 3, the rudder will likewise pivot counterclockwise, and vice versa, for the clockwise displacements illustrated in FIGURE 4.

It is important to observe in FIGURE 5 that the long fore-and-aft cavity 40 continues upwardly in a narrowing run 40A extending high into the prow to terminate in a small recess 32 beneath the steering post, there being a small flat overhang 32A formed at this point from beneath which projects a towing shackle 31 pivotally captured on the post by the upper end region 37E of the steering link 37 (FIGURE 4), the link 37 being of such thickness and shape as to lie shielded within said narrowing bottom cavity, so that it does not act as a prominence or a water foil which otherwise could cause erratic behavior of the hull when moving at higher speeds.

The tiller 35, in addition to being keyed to the steering post 36 is secured thereto by cap-bolt means 26 (FIGURES 6 and 10A).

The steering mechanism comprising the steering yoke or tiller 35, rudder 30, link means 37 and pin-and-slot coupling means 33, 39, affords a lever system having a mechanical advantage calculated to pivot the rudder 45° responsive to an angular displacement of the rudder post of only about 15°, the limits of movement of the steering bar in both directions being illustrated in dotted lines in FIGURES 3 and 4, wherein it will be seen that the opposite ends 35E of the steering bar remain preferably always inboard within the deck margins in their extreme limits of angular displacement so that no obstructions project outboard and the operator's hands may be kept inboard.

The special hull configuration with respect to the bottom or keel cavity 40, as seen in FIGURES 3 to 7, for example (but compare also FIGURES 14 through 17), provides on the wetted surface, at least, a pair of parallel bilges 41A, 41B lying on opposite sides of the fore-and-aft bottom axis or keel line and extending from the bow to the sternmost limits of the bottom, it being noted particularly in FIGURES 5, 6 and 7 that the rudder is set forward in this cavity, which continues, as previously stated, into the narrowing run 40A which shields the steering link 37, well up into the shackle and steering post recess 32. For best towing performance the trailing post recess 32. For best towing performance the trailing tip 30X of the rudder in its extreme displacements, as seen in FIGURES 3 and 4, crosses slightly beyond the bilges 41A, 41B for slight exposure to water movements occurring in the cavitateous hull formations which adjoin the bottom cavity, so that the rudder tends to center itself if left free.

The unusual action of the novel hull in respect to its ability to run parallel to the course of the towing vessel at any position laterally to one side of the course thereof and to ride upon or across its wake in either direction while remaining substantially level and on a forward, substantially parallel course at all times, is due to the particular cavitateous configurations provided on the wetted surface, and the intervening bilges and turns existing in conjunction therewith, including the keel or bottom cavity 40 and flanking bilges 41A, 41B, which as viewed in FIGURES 3 and 14, for example, are flanged by side cavities 45A, 45B, respectively, extending uninterruptedly from a large area confluent with the prow in each instance, as in FIGURE 6, all the way aft to terminate respectively in lesser areas at 45AX, 45BX in each instance, these side fore-and-aft cavities in turn defining another set of bilges referred to as the side bilges represented by the turns at 48A, 48B, FIGURES 6 and 7 particularly. See also the configurations revealed by the sections at the several stations represented in FIGURES 14 through 17.

For purposes of description, the remaining wall portions 47 of the hull, rising between the outer or side bilges 48A, 48B and the deck level, are referred to as the freeboard, since these areas are only incidentally wetted depending upon the load carried by the craft and the resultant displacement thereof, it being noted by way of comparison that a hull of the form described having a depth of about 10 inches and a width of about 26 inches at the prow, with a depth of about 5 inches and a width of about 23 inches at the stern, and an overall length of about 64 inches, fabricated from fibre glass with an average wall thickness of about .110 in. and weighing approximately 20 pounds, can support two adults or a load of about 600 pounds, and under such conditions will sink to a level which will be about at the rub rail 50 (FIGURES 1, 6 and 7), it being observed in passing that even under such burdens the craft will exhibit the same maneuverability and wake-riding capabilities as when lightly loaded by a child or single occupant. The addition of flotation filled 29 renders the craft unsinkable in the event of any accident which might admit water to the hull cavity.

As previously mentioned, the hull configuration is such that there is a minimized tendency to plane at all speeds when the vessel is towed, in which respect the device differs radically from conventional water sleds, surfboards, and the like, having more or less flat or extensive wetted and bottom areas, whether capable of floating their loads or not.

Much, and frequently all, of the control which the operator of the ordinary water sled or skiing device or towable planing hull can exercise over his course and attitude when towed, even in relatively smooth waters, depends upon the angle of attack of the wetted surface to the water and vice versa, skillful shifting of body weight and like tilting of the usual surfing boards and sleds being relied upon, frequently in addition to the use of a rudder to keep such devices afloat and in reasonable balance and angular relation to waves, wake and the course of the towing vessel, with uncomfortable and sometimes dangerous results when control is lost with these devices as the result of diving, yawing, flipping, washes and unfavorable maneuvers of the towing vessel.

By way of contrast, the disclosed hull configuration requires none of the experience, skill and precautions essential to the successful operation of ordinary planing sleds, surfboards, skis, and the like, and it affords a much less demanding and much safer sporting exercise with greater maneuverability because the craft is substantially independent of the movements of the towing vessel other than for motive power. For example, a competent child can handle the craft moving at a speed of 40 miles per hour on a tow line as short as 18 feet behind a 38-foot cruiser, and easily hold a course parallel to that of the towing vessel while standing at an angle of about 12° off the stern of that vessel; and at such short tow distances the craft can easily and safely be made to cross the wake and wash from twin propellers and assume the opposite position. The same maneuvers can be performed on longer and longer tow lines, in the regions of maximum water turbulence created by single or twin-screw engines, far back in the widening zones of the wake or close in, without special attention to any of these conditions which profoundly affect the behavior of prior craft of this general class.

The outstanding performance of the disclosed hull arises from the character of the fore-and-aft contours along the bottom axis or keel line and the adjoining bilge turns substantially in the form and location described, which afford appropriate lift at all points regardless of the angle of attack in the hull-to-water engagement, and regardless of the character or magnitude of any turbulence from waves, wake, passage of water and various combinations of these factors, it being noted that the point of attachment or hitch for the towline is far forward and in a region of maximum buoyancy of the craft, and that the rudder is also forward but appreciably aft the tow post or shackle point.

Water is channeled in substantial volume along the keel cavity beginning at a point well forward of the rudder post but at a level close to the upper margins of the rudder, as can be appreciated from an inspection of FIGURES 3, 5, 6, and 7, so that the rudder is not self-cavitating and does not starve for pressure water even at very high speeds, while substantial lift if obtained by moving water all along the keel line beginning from a point high up on the prow.

Since the hull shallows appreciably toward the stern (compare FIGURES 6 and 7), it is found feasible to provide a pair of shallow fins 52 located close to the stern on the bottom bilges to stabilize the craft with sustained lift in these quarters so that the bottom cavity need not be made deeper in this area in view of the already low freeboard existing adjacent the stern, and the proximity of the cockpit floor to the bottom (dotted lines, FIGURE 7).

The provision of symmetrical fore-and-aft concavo-convexly curved rearwardly-flowing surfaces between the bottom and side bilges preserves the lift in all attitudes and eliminates presentation of "hard" or flat impact surfaces to advancing water whether rolling upwardly or downwardly against, or beneath, or along the wetted surface, the flat freeboard area 47 being kept small at full displacement in relation to the much larger curved and cavitateous areas.

While the vessel's capabilities are most apparent when being towed, its stability in turbulent water is noteworthy when self-propelled, as by a small outboard motor or under sail, the embodiment shown being equipped with a sail 71 bent to a mast 70 removably fitted in a mast seat in the form of a water-tight flanged tube 72 set in the foredeck and terminating near the bottom of the hull in a small step 73, which may be formed as an integral part of the molded hull shell.

The rudder 30 (FIGURES 5 and 21) is provided with a pair of keel-hanging holes 62 for receiving means for attachment of a fin keel 60 which may be molded from reinforced plastic (as may the rudder) and is provided with a rudder pocket 61 in which the rudder 30 fits closely, as in FIGURE 18. A pair of holes 63 in the keel registers with the holes in the rudder to receive toggle pins 64 or a like quickly-applied fastening means.

Ballast is provided by an enlarged tank appendage 65 formed along the bottom of the fin keel and having a filler plug 66 near one end thereof through which water may be introduced with the aid of a small breather passage 67 opening through the trailing edge of the keel above the level of the tank.

While the keel turns with the rudder, the large area thereof permits steerage with insignificant leeway and no practical interference with the lateral resistance necessary to produce forward drive when sailing on the wind, since the angular movement of the large keel area needed to alter the course is very slight.

Thus, the sailing gear is removable for stowage, along with the hull itself, in the automobile trunk compartment.

FIGURES 22A through 22D portray by line curves the laterally undulating character of the curvature of the skin or wetted surface areas of the hull taken at the corresponding stations designted A, B, C and D in FIGURE 2, it being observed that these curves, while reduced in scale, each reproduce the curvatures seen in the larger sectional views taken through the entire hull at these same stations which also correspond respectively to the section lines 14—14, 15—15, 16—16 and 17—17, the curves E and F, however, representing surface curvatures seen in the planes of elevation normal to the base line K—K when the hull is viewed bow-in and stern-on, as in FIGURES 6 and 7.

Thus, the curves A to F of FIGURE 22 show the hull configuration to have smoothly confluent, symmetrical alternating concave and convex undulations when viewed crosswise of the vessel or athwart the base or keel line K—K, beginning with the concavity 40 running fore and aft centrally along the bottom, with the flanking lower bilges or convex turns 41 likewise running fore and aft from the stern well forward into the bow region, and flanked in turn by the side cavities 45, similarly extended, and turning into the upper side bilges 48 close below the freeboard area 47, it being observed that the degree of convexity and concavity of the configurations represented in the foregoing curves A to F tends to be most pronounced near the bow and to diminish or become flatter toward the stern, where the deadrise or distance vertically above the base line K—K is likewise considerably diminished in comparison with the height at the bow, giving the vessel a marked rake with respect to the base or-keel-line K—K, sternward from the relatively high, snubly and upwardly rising rounded bow configuration.

Certain terminology found convenient herein may be defined for purposes of the appended claims as follows:

Afterquarters refers to the area between stations B and C and sections 15—15 to 16—16, FIGURE 2.

Amidship or 'midship section refers to the fore-and-aft regions immediately adjoining the section line 15—15 in FIGURE 5.

Athwart (-ship) refers to members and measurements taken crosswise of the hull and keel line K—K.

Base line refers to a straight medial bottom line, synonymous with keel line running centrally along the bottom of the hull from bow to stern.

Bilge and bilge turns refer to more or less longitudinally-extensive transversely convex prominences running fore-and-aft on the wetted surface (at least) and resulting from a change in direction in the hull contour as, for example, between an adjacent fore-and-aft or longitudinal concavity along its line of juncture with an adjoining fore-and-aft convexity as at 45X (FIGURES 1 and 6).

Bow refers generally to the foremost regions of the hull below and above the water line, as distinguished from the aftermost regions comprising the stern, below and above the water line.

Bow quarters refers to the region forward of station D between sections 14—14 and 15—15, FIGURE 2.

Cutwater refers to those portions of the bow which normally make leading entry into and advance through the water, whether quiescent or turbulent, in varying degrees of displacement of the hull due primarily to its passenger load and the position of the load whether farther aft, as in standing positions of the operator, or farther forward as in the prone position.

Forequarters refers to the areas of the hull forward of the station C or line 15—15 (FIGURE 2) toward the bow.

Freeboard refers to those portions of the hull which normally are intended or expected to stand for the most part above the water line, loaded or free, and which are not primarily intended to be wetted or to move in or against the water, except as the water line may incidentally rise or fall due to the passenger load, tilting, turbulence, etc. in distinction to those more extensive underwater areas which are intended to be wetted and moved against and through the water.

Keel line refers to the fore-and-aft axis along the bottom between bow and stern coincident with the base line mentioned above and along which a keel would lie if the vessel had a keel in the usual sense of this word.

Prow refers to the foremost outboard hull areas including wetted cutwater areas as well as immediately adjoining freeboard areas.

Stern refers to those rearmost portions of the hull abaft the station A and section lines 17—17 (FIGURE 2).

Sternquarters refers to the portion of the hull abaft station B and section 16—16 (FIGURE 2).

Thwartship or thwartwise across the hull in a direction at right angles to the keel line.

Water line, loaded and free, refers to the imaginary and somewhat variantly positioned line about the hull which the water level will usually trace when the vessel is resting in substantially quiet water with or without its intended load.

Inflection refers to the character of the cross-sectional curvature, whether concave or convex, the point of inflection being the point at which the curvature changes from one to the other character.

I claim:

1. A marine hull configuration of the displacement type particularly suited for sport towing craft and characterized by having a wide bottom surface on opposite sides of the keel line with a fore-and-aft bottom cavity extending from bow to stern along said keel line, said bottom cavity being flanked on opposite sides by a contiguous convex bilge formation also extending fore and aft from the bow region to the stern; a further fore-and-aft side concavity contiguous to each convex bilge formation and extending from the bow region to the stern, said side concavities each being flanked by an upper fore-and-aft bilge turn contiguous thereto and likewise extending from the stern into the bow region; a circumambient free-board area contiguous to and rising above the respective side bilges merging in water-tight conjunction with a top decking, and defining a water-tight body structure, said decking including a cockpit and a foredeck; said hull being provided with steering means including a rudder set in said bottom cavity at a point forward of amidship and aft of the bow, and an external rudder-linkage drivingly engaging the rudder and lying recessively within said bottom cavity for substantial shielding from water flow in a direction generally crosswise of the keel line.

2. The hull configuration of claim 1 wherein said rudder is partially unbalanced with its turning axis substantially normal to the keel line and located a distance considerably forward of the trailing edge of the rudder and a smaller distance aft of the leading edge thereof, said trailing edge lying a small amount crosswise of either of the bottom bilges flanking the bottom cavity in the extreme angular displacements of the rudder.

3. The hull construction defined in claim 1 further characterized in that said cockpit includes a floor portion overlying a bottom portion of the hull and said watertight body structure is substantially filled with a flotation material affording support for said cockpit floor.

4. The structure defined in claim 1 wherein said bottom cavity extends above the wetted surface upwardly into the prow terminating in a recess in the hull, and said linkage includes a long lever arm shielded within the bottom cavity as aforesaid and having one end portion drivingly interconnecting with the rudder, a further portion curved upwardly and terminating in an upper end portion disposed in said recess, tiller means on said foredeck, and a steering post connecting with said tiller means and extending into said recess and into driving engagement with said upper portion of the lever arm.

5. The construction of claim 1 further including a towing shackle pivotally carried on a steering post and captured between the upper end of a lever arm and a portion of a recess.

6. A hull configuration according to claim 1 wherein said concave and convex formations extend confluently into the stern and bow areas of the hull and define an undulating wetted surface therefor when the hull is viewed in cross-section at any thwartship station taken between opposite sides of the hull forward of the stern and aft of the bow.

7. A hull structure according to claim 1 wherein the configuration of the wetted surface of the hull viewed in cross sections athwartship taken at stations substantially equal distances apart from the stern forward to the bow, is characterized by the curves A, B, C and D each having a central inflection 40 including the base line K—K, convex inflections 41 on opposite sides and upwardly of the base line merging into further concave inflections 45 which continue upwardly into further convex inflections 48 respectively locating at levels close to the water line, said hull having a vertical deadrise from base line to water line which is greater at the bow than at the stern, said bow being rounded forwardly and upwardly to define curved cutwater areas into which said concave and convex configurations are smoothly merged.

8. Dirigible water craft particularly suited to towing at low and high speeds and characterized by stability and maneuverability in turbulent wake and wash waters with ability to hold a steered course offset from but parallel to that of the towing vessel and to ride upon and across and in the trough of the wake and wash of the towing vessel while holding such course, said craft comprising a hull having a pair of long bilges extending fore and aft along opposite sides of a bottom area from bow to stern, there being a bottom fore-and-aft cavity between said bilges and at least coextensive therewith, said bottom cavity continuing in an arcuate path upwardly high into the bow region; said hull further having additional fore-and-aft bilges running along its opposite sides at a level substantially higher than that of said first-mentioned bilges, there being a substantial lengthwise concavity running from the bow region to the stern region on each side of the hull between the said bilges thereon; rudder means extending downwardly from the bottom in said bottom cavity and located forward of the midship station and aft the bow; and steering means operatively interconnecting with said rudder by means of a ratio lever linkage disposed in the bottom cavity and the said continuing portion thereof.

9. Water craft according to claim 8 including a ballasted fin keel having a pocket to receive said rudder and means penetrating the keel and rudder to secure the former removably to the latter, said keel having a tank portion at a region thereon substantially below said pocket and adapted to contain a volume of ballast water.

References Cited
UNITED STATES PATENTS

| | | | |
|---|---|---|---|
| 359,861 | 3/1887 | Hanlen | 114—62 |
| 652,876 | 7/1900 | Andrade | 114—56 |
| 956,404 | 9/1910 | McNeely | 114—162 |
| 2,422,183 | 6/1947 | Clement | 9—6 |
| 2,735,392 | 2/1956 | Cox | 114—62 |
| 2,887,978 | 5/1959 | Tritt | 114—66.5 |

MILTON BUCHLER, *Primary Examiner.*

R. A. DORNON, *Assistant Examiner.*

UNITED STATES PATENT OFFICE
CERTIFICATE OF CORRECTION

Patent No. 3,371,361                          March 5, 1968

Walter Andersen

It is certified that error appears in the above identified patent and that said Letters Patent are hereby corrected as shown below:

Column 4, line 67, for "filled" read -- filler --; column 6, line 45, for "bow-in" read -- bow-on --; line 64, for "or-" read -- or --; column 8, line 31, for "upper" read -- upper end --.

Signed and sealed this 24th day of June 1969.

(SEAL)
Attest:

Edward M. Fletcher, Jr.                     WILLIAM E. SCHUYLER, JR.
Attesting Officer                             Commissioner of Patents